United States Patent
Tsai et al.

(10) Patent No.: US 12,169,841 B2
(45) Date of Patent: *Dec. 17, 2024

(54) SYSTEM AND METHOD TO PREVENT UNAUTHORIZED USAGE OF CARD READERS AND MODULAR ELECTRONIC FUNDS TRANSFER POINT OF SALE DEVICE

(71) Applicant: Stripe, Inc., South San Francisco, CA (US)

(72) Inventors: Hwai Sian Tsai, Hong Kong (HK); Chi Wah Lo, Hong Kong (HK)

(73) Assignee: Stripe, Inc., South San Francisco, CA (US)

( * ) Notice: Subject to any disclaimer, the term of this patent is extended or adjusted under 35 U.S.C. 154(b) by 563 days.

This patent is subject to a terminal disclaimer.

(21) Appl. No.: 17/339,058

(22) Filed: Jun. 4, 2021

(65) Prior Publication Data

US 2021/0295337 A1 Sep. 23, 2021

Related U.S. Application Data

(63) Continuation-in-part of application No. 17/091,051, filed on Nov. 6, 2020, now Pat. No. 11,321,719, (Continued)

(51) Int. Cl.
*G06Q 20/40* (2012.01)
*G06K 7/06* (2006.01)
(Continued)

(52) U.S. Cl.
CPC ............ *G06Q 20/409* (2013.01); *G06K 7/06* (2013.01); *G06K 7/10009* (2013.01); (Continued)

(58) Field of Classification Search
CPC .. G06K 7/06; G06K 7/10009; G06K 7/10405; G06Q 20/409; G06Q 20/34; G06Q 20/352; G07F 7/0893
See application file for complete search history.

(56) References Cited

U.S. PATENT DOCUMENTS

2005/0156029 A1 7/2005 Hopkins
2006/0214845 A1 9/2006 Jendbro et al.
(Continued)

FOREIGN PATENT DOCUMENTS

CN 2257046 6/1997
CN 2515713 10/2002
(Continued)

OTHER PUBLICATIONS

National Intellectual Property Administration, PRC; The First Office Action of CN Application No. 201880048317.9; (related application); Jan. 5, 2023; 12 pgs.
(Continued)

*Primary Examiner* — Laura A Gudorf
(74) *Attorney, Agent, or Firm* — Womble Bond Dickinson (US) LLP

(57) ABSTRACT

A contactless card reader comprises a contactless card reader front-end coupled to a processor. A communications module is coupled to the processor and a set of sensors is coupled to the processor. The set of sensors determines parameters related to the location, orientation and motion of the card reader. The processor receives the parameters from the set of sensors and utilizes the parameters and scenario configuration data to evaluate a rule. The result of the evaluation of the rule results in a limitation on the operation of the card reader. The communications module is configured to intermittently receive the scenario configuration data from external sources.

20 Claims, 11 Drawing Sheets

Related U.S. Application Data which is a continuation of application No. 16/394,213, filed on Apr. 25, 2019, now Pat. No. 10,832,252, which is a continuation of application No. 16/046,573, filed on Jul. 26, 2018, now Pat. No. 10,318,959, application No. 17/339,058 is a continuation-in-part of application No. 16/046,521, filed on Jul. 26, 2018, now abandoned, said application No. 16/046,573 is a continuation of application No. 15/343,917, filed on Nov. 4, 2016, now Pat. No. 10,055,738.

(60) Provisional application No. 62/538,285, filed on Jul. 28, 2017.

(51) Int. Cl.
  G06K 7/10 (2006.01)
  G06Q 20/34 (2012.01)
  G07F 7/08 (2006.01)

(52) U.S. Cl.
  CPC ......... G06K 7/10405 (2013.01); G06Q 20/34 (2013.01); G06Q 20/352 (2013.01); G07F 7/0893 (2013.01)

(56) References Cited

U.S. PATENT DOCUMENTS

| | | | |
|---|---|---|---|
| 2008/0189214 | A1 | 8/2008 | Mueller et al. |
| 2011/0251958 | A1 | 10/2011 | Aubin et al. |
| 2013/0144731 | A1 | 6/2013 | Baldwin et al. |
| 2014/0085089 | A1 | 3/2014 | Rasband et al. |
| 2014/0164154 | A1* | 6/2014 | Ramaci ............. G06Q 20/3674 705/16 |
| 2014/0263625 | A1 | 9/2014 | Smets et al. |
| 2014/0289129 | A1 | 9/2014 | Savolainen et al. |
| 2014/0365366 | A1 | 12/2014 | Spinella |
| 2015/0310410 | A1 | 10/2015 | Chai et al. |
| 2016/0027006 | A1 | 1/2016 | Billett |
| 2016/0171361 | A1 | 6/2016 | Chatterton et al. |
| 2016/0203480 | A1 | 7/2016 | Dravenstott et al. |
| 2016/0316367 | A1 | 10/2016 | Rose et al. |
| 2018/0082297 | A1 | 3/2018 | Bacastow |
| 2018/0096329 | A1 | 4/2018 | Hamilton et al. |

FOREIGN PATENT DOCUMENTS

| | | |
|---|---|---|
| CN | 101039183 A | 9/2007 |
| CN | 201007824 | 1/2008 |
| CN | 201035502 | 3/2008 |
| CN | 101329399 A | 12/2008 |
| CN | 101836223 A | 9/2010 |
| CN | 101872454 A | 10/2010 |
| CN | 102013001 A | 4/2011 |
| CN | 102184499 A | 9/2011 |
| CN | 102422302 A | 4/2012 |
| CN | 102811276 A | 12/2012 |
| CN | 202662098 U | 1/2013 |
| CN | 102956069 A | 3/2013 |
| CN | 102956077 A | 3/2013 |
| CN | 103186809 A | 7/2013 |
| CN | 103377517 A | 10/2013 |
| CN | 103425944 A | 12/2013 |
| CN | 103700192 A | 4/2014 |
| CN | 104054098 A | 9/2014 |
| CN | 104951938 A | 9/2015 |
| CN | 105388820 A | 3/2016 |
| CN | 106415611 A | 2/2017 |
| CN | 106980801 A | 7/2017 |
| CN | 106991306 A | 7/2017 |
| CN | 103413218 B | 11/2017 |
| CN | 106709382 B | 12/2019 |
| CN | 110291567 B | 6/2021 |
| GB | 2524946 A | 10/2015 |
| WO | 2012/163256 A1 | 12/2012 |
| WO | 2015/132559 A1 | 9/2015 |

OTHER PUBLICATIONS

National Intellectual Property Administration, PRC: Notification to Grant Patent Right for Invention of CN Application No. 2017800822099 (related application); Mar. 22, 2021; 4 pages.

International Preliminary Report on Patentability received for PCT Patent Application No. PCT/IB2017/001764, mailed on May 16, 2019, 6 pages.

International Search Report and Written Opinion received for PCT Patent Application No. PCT/IB2017/001764, mailed on Aug. 15, 2018, 9 pages.

Notice of Allowance received for Chinese Patent Application No. 201780082209.9, mailed on Mar. 22, 2021, 3 pages (2 pages of English Translation and 1 pages of Original Document).

Office Action received for Chinese Patent Application No. 201780082209.9, mailed on Feb. 21, 2020, 24 pages (13 pages of English Translation and 11 pages of Original Document).

Office Action received for Chinese Patent Application No. 202110620168.2, mailed on Oct. 31, 2023, 9 pages (4 pages of English Translation and 5 pages of Original Document).

Patent Cooperation Treaty: International Search Report and Written Opinion of PCT/CN2018/097361, Oct. 30, 2018, 7 pages.

Payment Card Industry (PCI) PIN Transaction Security (PTS) Hardware Security Module (HSM): Modular Security Requirements version 3.0 Jun. 2016, retrieved from https://www.pcisecuritystandards.org/documents/PCI_HSM_Security_Requirements_v3_2016_final.pdf? agreement=true&time=1611720502932.

The Second Office Action received for Chinese Patent Application No. 201780082209.9, mailed on Nov. 4, 2020, 8 pages (5 pages of English Translation and 3 pages of Original Document).

National Intellectual Property Administration, PRC; The First Office Action of CN Application No. 201780082209.9; (related application); Feb. 21, 2020; 16 pages.

Translation of Intellectual Property Administration, PRC; The First Office Action of CN Application No. 201780082209.9; (related application); OA dated Feb. 21, 2020; 13 pages.

Notification to Grant Patent Right for Invention received for Chinese Patent Application No. 202110620168.2, mailed on Mar. 22, 2024, 3 pages (2 pages of English Translation and 1 page of Original Document).

* cited by examiner

| | Mobility — Location of Card Reader | |
|---|---|---|
| Portability — Motion of Card Reader at Location | Static | Motion |
| Fixed | Terminal fixed in store with restricted access | Ticketing machine on public vehicle |
| Mobile | Street merchant, taxi | Merchant on vehicle (vending trolley on train) |
| Handheld | Package delivery | Merchant on vehicle (in-flight purchase) |

FIG. 8

| | Reader Motion | Installation Motion | Location | Orientation | Motion |
|---|---|---|---|---|---|
| 901 | Fixed | Static | Fixed location<br>GPS: Exact<br>Beacon: Received<br>Altimeter: Exact | Fixed orientation<br>Orientation/incline sensor: Exact<br>Compass: Exact | No movement (displacement, velocity, acceleration)<br>Accelerometer: Static<br>Gyroscope: Static |
| 902 | Fixed | Motion | Supplement to orientation information for decision making<br>GPS: In range<br>Beacon: Received<br>Altimeter: In range | Orientation within limited range with limited rate of change compared to rate of change of motion and location<br>Orientation/incline sensor: In range<br>Compass: Agree with gyroscope. | No movement for a period of time, movement will trigger re-authorization<br>Accelerometer: Agree with GPS prediction and orientation range<br>Gyroscope: Agree with compass |
| 903 | Mobile | Static | Within a pre-defined range, fixed for a period of time before reading, re-authorization after relocation<br>GPS: In range and static<br>Beacon: Received<br>Altimeter: In range and static | Within a pre-defined range, fixed for a period of time before reading, re-authorization after orientation change<br>Orientation/incline sensor: In range<br>Compass: Static | No movement for a period of time, movement triggers re-authorization<br>Accelerometer: Static<br>Gyroscope: Static |
| 904 | Mobile | Motion | Supplement to orientation information for decision making<br>GPS: In range<br>Beacon: Received<br>Altimeter: In range | Orientation within a limited range with rate of change not greatly exceeding the rate of change of motion and location<br>Orientation/incline sensor: In range<br>Compass: Agree with gyroscope | Supplement to orientation information for decision making<br>Accelerometer: Agree with GPS prediction & orientation range<br>Gyroscope: Agree with compass |

FIG. 9A

| Reader Motion | Installation Motion | Location | Orientation | Motion |
|---|---|---|---|---|
| Handheld | Static | Re-authorize after a location change that exceeds a pre-defined range<br>GPS: Exact<br>Beacon: Received<br>Altimeter: Exact | N/A | Allow for a limited range of acceleration and velocity. Re-authorization after a large displacement<br>Accelerometer: In range<br>Gyroscope: N/A |
| Handheld | Motion | Tied to vehicle or platform by season signal or pre-defined route<br>GPS: In range<br>Beacon: Received<br>Altimeter: In range | N/A | N/A |

905 — first data row
906 — second data row

FIG. 9B

| Reader Motion | Installation Motion | Location | Orientation | Motion |
|---|---|---|---|---|
| Fixed | Static | Fixed location Beacon: Received | Fixed orientation Orientation/incline sensor: Exact | No movement (displacement, velocity, acceleration) Accelerometer: Static |
| Fixed | Motion | In a defined vehicle or compartment Beacon: Received | Fixed installation in vehicle so incline reading is within range. Orientation/incline sensor: In range | No large vertical displacement. Accelerometer: Vertical displacement in range |
| Mobile | Static | Within a pre-defined range, fixed for a period of time before reading, re-authorization after relocation Beacon: Received | Within a pre-defined range, fixed for a period of time before reading, re-authorization after orientation change Orientation/incline sensor: In range | No movement for a period of time, movement triggers re-authorization Accelerometer: Static |
| Mobile | Motion | Supplement to orientation information for decision making Beacon: Received | Orientation within a limited range with rate of change not greatly exceeding the rate of change of motion and location Orientation/incline sensor: In range | Supplement to orientation information for decision making Accelerometer: Agree with predicted range |
| Handheld | Static | Within pre-defined range, re-authorization after large location change Beacon: Received | N/A | Limited range of acceleration and velocity, re-authorization after large displacement Accelerometer: In range |
| Handheld | Motion | Bind to vehicle by beacon signal or pre-defined route Beacon: Received | N/A | N/A |

FIG. 10

SYSTEM AND METHOD TO PREVENT UNAUTHORIZED USAGE OF CARD READERS AND MODULAR ELECTRONIC FUNDS TRANSFER POINT OF SALE DEVICE

CROSS-REFERENCE TO RELATED APPLICATIONS

This application is a Continuation-In-Part of U.S. patent application Ser. No. 17/091,051, filed on Nov. 6, 2020, entitled SYSTEM AND METHODS TO PREVENT UNAUTHORIZED USAGE OF CARD READERS, which is a Continuation of U.S. patent application Ser. No. 16/394,213, filed on Apr. 25, 2019, entitled SYSTEM AND METHODS TO PREVENT UNAUTHORIZED USAGE OF CARD READERS, issued as U.S. Pat. No. 10,832,252, issued on Nov. 10, 2020, which is a Continuation of U.S. patent application Ser. No. 16/046,573, filed on Jul. 26, 2018, entitled SYSTEM AND METHODS TO PREVENT UNAUTHORIZED USAGE OF CARD READERS, issued on Jun. 11, 2019 as U.S. Pat. No. 10,318,959, which is a Continuation of U.S. patent application Ser. No. 15/343,917, filed on Nov. 4, 2016, entitled SYSTEM AND METHODS TO PREVENT UNAUTHORIZED USAGE OF CARD READERS, issued on Aug. 21, 2018, as U.S. Pat. No. 10,055,738, the specifications of which are incorporated by reference in their entirety. This application is also a Continuation-In-Part of U.S. patent application Ser. No. 16/046,521, filed on Jul. 26, 2018, entitled MODULAR ELECTRONIC FUNDS TRANSFER POINT OF SALE DEVICE, which claims the benefit of U.S. Provisional Application No. 62/538,285, filed Jul. 28, 2017, the specifications of which are incorporated by reference in their entirety.

TECHNICAL FIELD

The present disclosure relates to the design of electronic funds transfer terminals. In particular it relates to the design of card readers within a point of sale terminal to facilitate easy replaceability and determine when a contactless card reader is used in a fraudulent manner.

BACKGROUND

In order to securely accept payment using a payment card such as a financial, credit, or debit card, a terminal is commonly used. These terminals are often referred to as Electronic Fund Transfer Point-of-Sale (EFTPOS) terminals or simply as Point-of-Sale (POS) terminals. EFTPOS terminals can be viewed as supporting two distinct functions: card reading and card holder authentication.

Card reading comprises reading secure data from a payment card at a point of interaction. Financial cards can support one or more forms of data storage and transfer such as magnetic stripe cards, Europay Mastercard Visa (EMV) compliant chip cards, contactless chip cards, and phone card emulation mode. The information stored within a financial card enables the identification of the card, either by account number such as a payment card number, a Primary Account Number (PAN), a representative token, or other method. The card reader can further authenticate a chip card by using cryptographic measures such as offline-data-authentication. The interoperability between card readers and cards are ensured by industrial standards such as EMV, and account privacy protection can be evaluated against industrial standards such as PCI Secure Reading and Exchange of Data (SRED).

There exists a number of short-range wireless technologies to enable card reading from a payment card. Example of this type of wireless technology include touchless protocols such as RFID and NFC (Near Field Communication). There are a number of common applications known in the art such as bank cards, stored value cards, loyalty cards, and access cards. These cards often contain valuable and sensitive data which needs to be protected from unauthorized access. It is important to protect the privacy of the data and to ensure its authenticity and integrity.

Though there are obvious advantages of using a touchless card to make payments there are drawbacks as well. Inherent in the wireless nature of the technology is that it is much easier to access the card or to eavesdrop on data being transferred between a card and a card reader when compared to other technology that requires a direct connection between the card and the reader. Due to the fact that a card reader can read the card data without touching the card, unauthorized accessing or eavesdropping of card data transfers may occur without the user being aware of the unauthorized card reading operation.

A number of solutions to this problem that have been proposed. Some are based on improving security in the card while others concentrate on improving security in the card reader. A card reader can require the manual input of an authorization code or password at power up or at a predefined interval. Other systems detect when a card has been removed from the proximity of a reader and automatically stop any data transfer operations. Other security measures require the card holder to authenticate using an emulated card or e-wallet application on a mobile device that asks for a user password or biometric authentication before allowing access. These existing solutions are all cumbersome and detract from the simplicity of using touchless card technology. Furthermore, most existing solutions focus on increasing the reader side security. There exists a need for technology that supplements and complements security features in the card, emulated card, or wallet by increasing security in the card reader. Solutions should decrease the risk of data theft while preserving the ease-of-use of the NFC and other touchless card and wireless technology.

Card holder authentication is usually the merchant's responsibility, either by requesting a user to enter a personal identification number (PIN) on a PIN pad, or to sign a signature on paper or screen. Newer implementations also include the card holder side authentication, in particularly for mobile phone based card emulation and/or electronic wallets. Authentication compliance is governed by standards such as PCI PIN Transaction Security (PTS).

Currently, EFTPOS terminals embed the card reading and the card holder authentication functionalities into a single device. The entire device is then certified against relevant payment security and interoperability standards. Further modification of the terminal is likely to affect the compliance of the unmodified functional parts, often requiring a recertification of the entire device. Moreover, configuring the terminal to address different merchant needs is difficult. For example, some merchants may only need to accept card payment without PIN support, but the PIN pad in the terminal may account for a significant portion of the total cost of the terminal.

In some examples, existing EFTPOS terminals can work with external modules. For example, a contactless card reader can be added to an existing EFTPOS terminal which does not support contactless card reading, or a PIN pad which is compliant with the relevant standards can be added to existing EFTPOS terminals which are not compliant in order to ensure compliance of the whole system. Nevertheless, despite having an expandable design, it is still not a modular architecture.

Other than EFTPOS terminals, there are some other kinds of terminals which are designed to be more modular. For example, an Automatic Teller Machine is designed to integrate a PIN pad module and card reader module into its chassis.

However, regardless of the different forms and variations of above mentioned devices and modules, a common design methodology is designing devices only to handle the task that the devices are supposed to perform. This is done in order to reduce the complexity of development, the scope of certification, and the cost of the device. For example, a card reading device will commonly be evaluated against interoperability evaluations, such as those proposed by EMVCo, and account data security standards such as PCI SRED. An authentication module such as a PIN pad will commonly be evaluated against security standards such as PCI PTS.

There exists a need for a modular architecture that may be used with an EFTPOS terminal to allow for the flexible implementation of both card reading and card holder identification without requiring additional compliance testing.

Other aspects and features of the present invention will become apparent to those ordinarily skilled in the art upon review of the following description of specific embodiments of the invention in conjunction with the accompanying figures.

SUMMARY

Embodiments of the invention include a point-of-sale device that comprise a card reading interface module configured to read card information from a payment card. A card holder authentication module, coupled to the card reading interface module, receives the card information from the card reading interface module and authenticates a financial transaction. In some embodiments, the card reading interface module is certified against a card holder authentication security standard. In other embodiments, the card holder authentication module is certified against a card reading security standard.

In other embodiments, the card information is encrypted by the card reading interface module prior to transmitting the card information to the card holder authentication module.

In other embodiments authenticating a financial transaction comprises receiving user authentication information and performing offline authentication utilizing the payment card.

In further embodiments authenticating a financial transaction comprises receiving user authentication information and transmitting modified user authentication information to an external authentication server, where the card holder authentication module receives an authentication confirmation from the external authentication server.

In other embodiments, the card holder authentication module processes the card information to construct a PIN block. The PIN block and the card information is used to produce modified card information and the modified card information is used to authenticate the financial transaction.

In other embodiments, the card holder authentication module processes the card information to construct a PIN block. The PIN block and the card information is used to produce modified card information. The modified card information is used to authenticate the financial transaction.

Other embodiments of the invention include a method of authenticating a financial transaction. The method comprises a card reading interface module receiving card information from a payment card. A card holder authentication module, coupled to the card reading interface module, receives the card information from the card reading interface module. In response to receiving the card information, the card holder authentication module computes modified card information. The modified card information comprises a PIN Block utilizing the card information. The card holder authentication module receives authentication credentials of a user and authenticates the financial transaction.

Some embodiments further comprise the card holder authentication module transmitting the modified card information to an external server. The external server receives the modified card information and returns an authorization to the card holder authentication module.

Further embodiments comprise the card holder authentication module transmitting the modified card information to the card reading interface module. The card reading interface module receives the modified card information and transmits it to the payment card. The payment card receives the modified card information and returns an authorization to the card reading interface module.

Other further embodiments comprise the card information being encrypted by the card reading interface module before transmitting the card information to the card holder authentication module.

In other embodiments, the authentication credentials are encrypted by the card holder authentication module before transmission to the card reading interface module.

In other embodiments, the modified card information is encrypted before transmission external to the card reading interface module or external to the card holder authentication module.

Further major embodiments include another method of authenticating a financial transaction. The method comprises a card holder authentication module receiving authentication credentials of a user. A card reading interface module, coupled to the card holder authentication module, receives the authentication credentials from the card holder authentication module. The card reading interface module transmits the authentication credentials to a payment card coupled to the card reading interface module. The card reading interface module receives card information from the payment card and computes modified card information. The modified card information comprises a PIN Block utilizing the card information. The card reading interface module transmits the modified card information to an external server. The external server receives the modified card information and returns an authorization to the card reading interface module.

In some embodiments, the card reading interface module is certified against a card holder authentication security standard. In other embodiments, the card holder authentication module is certified against a card reading security standard.

In further embodiments, the authentication credentials are encrypted by the card holder authentication module before transmission to the card reading interface module.

In other further embodiments, the modified card information is encrypted by the card reading interface module before transmission to the external server.

Other embodiments of the invention include a card reader comprises a contactless card reader front-end coupled to a processor. A communications module is coupled to the processor and a set of sensors is coupled to the processor. The set of sensors determines parameters related to the location, orientation and motion of the card reader. The processor receives the parameters from the set of sensors and utilizes the parameters and scenario configuration data to evaluate a rule. The result of the evaluation of the rule results in a limitation on the operation of the card reader.

In some embodiments of the invention the communications module is configured to intermittently receive the scenario configuration data from external sources. The communications module may be configured to tether an external device to the card reader. The external device comprises a second set of sensors. The second set of sensors determines parameters related to the location, orientation and motion of the card reader. The processor receives the second set of parameters through the communications module.

The card reader may be installed in a location and the rule may comprise parameters related to the location and movement of the location. The card reader may be fixed to a location. The card reader may be mobile within a location. The card reader may be a handheld device.

Another exemplary embodiment of the comprises a method of operating a card reader in a location. The method comprises installing the card reader in the location. The installation comprises classifying a mobility of the location and classifying a portability of the card reader. The card reader is configured with a scenario associated with the mobility of the location and the portability of the card reader. Parameters are read from a set of sensors located within the card reader. The parameters are related to the location, orientation and motion of the card reader. The parameters are evaluated to evaluate a rule. The rule is based on the scenario. The result of the evaluation of the rule results in a limitation on the operation of the card reader.

In some embodiments of the invention the configuration of the card reader comprises accessing the card reader through a communications module integrated with the card reader.

In other embodiments of the invention the method further comprises tethering an external device to the card reader. The external device comprises a second set of sensors. The second set of sensors determines parameters related to the location, orientation and motion of the card reader. The card reader receives the second set of parameters through the communications module. The card reader is installed in a location and the rule comprises parameters related to the location and movement of the location.

The method may apply when the card reader is fixed to a location. The method may apply when the card reader is mobile within a location. The method may apply when the card reader is a handheld device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

For a more complete understanding, reference is now made to the following description taken in conjunction with the accompanying Drawings in which:

FIG. 8 is a table illustrating examples for various locations and mobility options of a card reader;

FIG. 9A and FIG. 9B illustrate rules for given combinations of reader motion and installation motion for a large set of sensors; and FIG. 10 illustrates rules for given combinations of reader motion and installation motion for a limited set of sensors.

Figure 1:
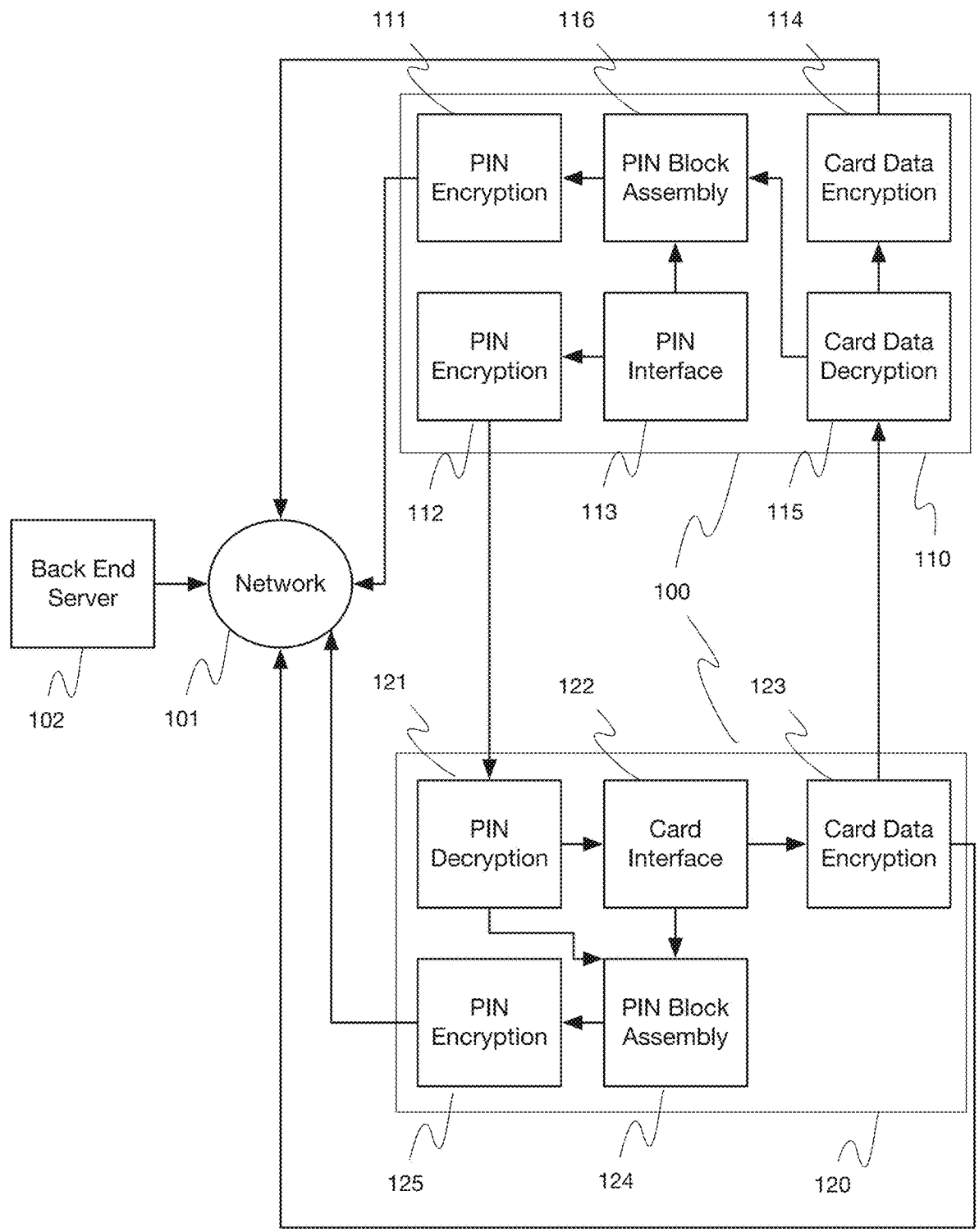
FIG. 1 depicts the general architecture of embodiments of the invention with the directions of possible data flow illustrated.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Referring now to the drawings, wherein like reference numbers are used herein to designate like elements throughout, the various views and embodiments of SYSTEM AND METHOD TO PREVENT UNAUTHORIZED USAGE OF CARD READERS AND MODULAR ELECTRONIC FUNDS TRANSFER POINT OF SALE DEVICE are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The below describes systems and methods for a modular EFTPOS terminal architecture; and for prevention of unauthorized usage of contactless card readers. The EFTPOS comprises two separate modules implementing a card reading interface and card holder authentication, the two major functions of an EFTPOS. The card reading interface module adheres to industry standards and is able to process the PIN, signature, or other authentication data. The card holder authentication module is compliant with the relevant standards so as to allow processing of the card account data.

Card reading interface standards include PCI Secure Reading, Exchange of Data (SRED), and Payment Card Industry (PCI) Point to Point Encryption (P2PE).

Card holder authentication standards include PCI PIN Transaction Security (PTS).

Both modules receive certifications as required. The card reading interface module is required to be compliant with card holder authentication security standards such as PCI PIN Transaction Security (PTS), but is also compliant with account data security standards such as Payment Card Industry (PCI) Point to Point Encryption (P2PE). Similarly, the card holder authentication module is certified compliant with both card holder authentication security standards and account data security standards. In other words, each module is certified for the standards it requires for its functionality as well as for the standards required for the functionality of the other module. This architecture offers the flexibility to allow the card reading interface module to process the PIN, and the card authentication module to process card and account data. This modular design allows the EFTPOS system to be used together or with other devices. This avoids the problem of having to re-certify the entire EFTPOS system if one of the modules needs to be replaced. In the case of replacement, only the new module needs to be certified and not the entire system which reduces the time and cost of recertification.

FIG. 1 shows a general architecture of embodiments of the invention. Arrows show the directions of different possible data flow. Back-end server 102 performs functions such as acquiring and processing the payment transaction. It is coupled via network 101 to system 100 which comprises card holder authentication module 110 and card reading interface module 120. In this embodiment, back-end server 102 is coupled to modules 110 and 120 via network 101. In other embodiments, module 120 is connected with back-end server 102 via module 110 and network 101. In another embodiment, module 110 is connected to back-end server 102 via module 120 and network 101. In a further embodiment, module 110 and module 120 are coupled to network 101 via additional communication devices, not shown.

Network 101 may be implemented in a variety of ways known to those of skill in the art. For example, in one embodiment, network 101 comprises one or more subnetworks. In some embodiments, network 101 comprises at least one private network. In yet other embodiments, network 101 comprises at least one public network. In another embodiment, network 101 is implemented using one or more types of networks known to those of skill in the art. These types of networks include, for example, wireless networks, wired networks, Ethernet networks, local area networks, metropolitan area networks and optical networks.

Module 110 is a card holder authentication module which accepts card holder authentication data such as a PIN, or an electronic signature, biometric features, or any combinations of authentication data. While the rest of this specification will describe embodiments which use a PIN for authentication, it would be known to one of skill in the art that authentication using other identification factors is also possible using similar system architectures. In exemplary embodiments, module 110 comprises PIN encryption 111, PIN encryption 112, card data encryption 114, card data decryption 115, PIN interface 113 and PIN block assembly 116. PIN interface 113 serves to read PINs entered into module 110, before transmission to PIN encryption 111. PIN encryption 111 is coupled to back-end server 102 via network 101. It serves to encrypt PINs received from PIN block assembly 116 before transmission to back-end server 102 for online PIN authentication. PIN encryption 112 serves to encrypt PINs received from PIN interface 113 before transmission to PIN decryption 121 on module 120. This enables PIN data to be transferred from module 110 to module 120 securely, and allows module 120 to make use of the PIN for offline PIN authentication with the card, or to be re-encrypted and sent to backend server 102 for online PIN authentication. Card data encryption 114 is coupled to back-end server 102 via network 101 as explained above. It serves to encrypt card data before transmission to back-end server 102. Card data decryption 115 serves to receive and decrypt encrypted card data sent from card data encryption 123 residing on module 120. PIN block assembly takes place in PIN block assembly 116. PIN block assembly comprises using the card data for purposes such as constructing a PIN block in a format that requires the account number and repackaging the PIN in a different format so as to adapt to the processing requirements of the back-end server 102.

Module 120 is a card reading interface module. Module 120 comprises, PIN decryption 121, card interface 122, card data encryption 123, PIN block assembly 124 and PIN encryption 125. PIN decryption 121 serves to receive and decrypt encrypted PINs received from PIN encryption 112. Card interface 122 serves to read card data from a financial card. Card data encryption 123 serves to encrypt card data received from card interface 122 according to cryptographic standards before transmission to card data decryption 115 on module 110. In one embodiment, data is sent from card data encryption 123 to back-end server 102 via network 101. PIN block assembly 124 is used in embodiments where PIN block assembly is performed in module 120. This plays a similar role to PIN block assembly 116. PIN encryption 125 plays a similar role to PIN encryption 111. It is also coupled to back-end server 102 via network 101.

In one embodiment, modules 110 and 120 are physically located within an EFTPOS terminal and connected by a serial connection or other communications interface. The EFTPOS terminal may have other modules and devices such as printer and communication modules. In another embodiment, modules 110 and 120 are physically separate devices but are coupled together communicatively using a wireless technology such as Bluetooth. In some embodiments, the connection between PIN encryption 112 and PIN decryption 121, and the connection between card data encryption 123 and card data decryption 115 may occupy a single bidirectional, or multiplexed communications channel. In a further embodiment, the connections between module 110 and network 101, and between module 120 and network 101 are implemented using a common communications module. This communications module may be located in either module 110 or module 120, or may be an additional device, and coupled to network 101.

In some embodiments, the PIN, card and other sensitive data exchanged between modules 110 and 120 are protected via one or more cryptographic schemes. PIN encryption 112 and PIN decryption 121 are used to encrypt and decrypt PIN data, whereas card data encryption 123 and card data decryption 115 are used to encrypt and decrypt card data.

In a further embodiment, the communication channels between modules 110 and 120 are sufficiently secure that encryption is not necessary. In these embodiments, PIN encryption 112, PIN decryption 121, card data encryption 123 and card data decryption 115 may be omitted. In another embodiment, a single secure bidirectional channel is set up between modules 110 and 120, and all sensitive data including PIN and card data are transmitted securely over this single bidirectional connection.

If the encrypted data received by one module from the other module is not used, then the encrypted PIN data can be sent to the back-end server 102 without decryption and re-encryption. In some embodiments, module 120 uses module 110 to communicate with back-end server 102 via network 101. That is, the encrypted card data sent from card encryption 123 on module 120 is not used by module 110. Then the cryptographic scheme used to encrypt transmissions between card encryption 123 and back-end server 102 is established without utilizing card data decryption 115 and card data re-encryption 114.

Figure 2:
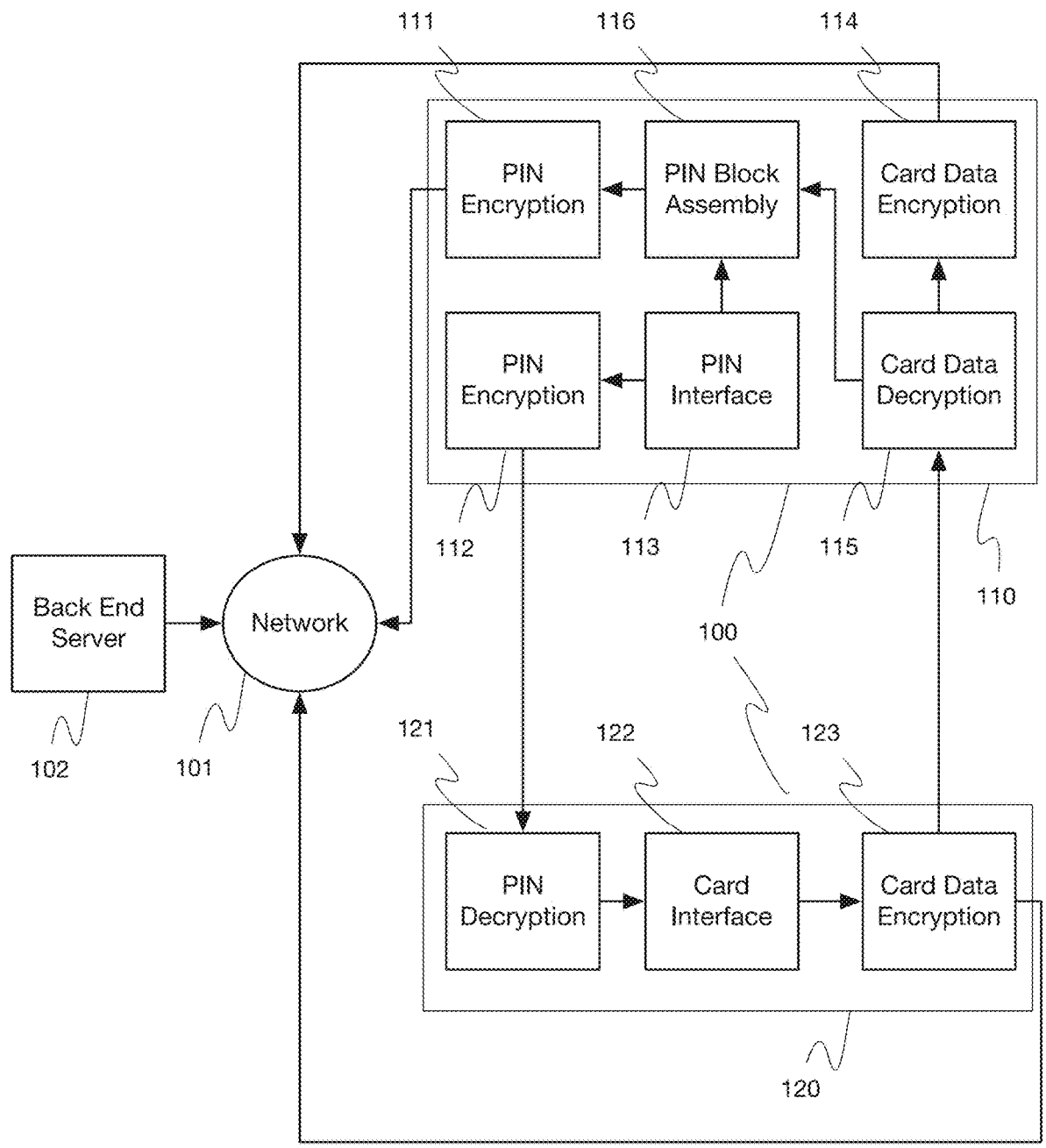
FIG. 2 depicts an example of one implementation supporting one exemplary embodiment of the invention.

There are many possible implementations for modules 110 and 120. FIG. 2 is a block diagram of one embodiment of the system and method. In this embodiment, the PIN Block Assembly 124 and PIN Encryption 125 features of the embodiment of FIG. 1 have been removed from card reading interface 120.

Figure 3:
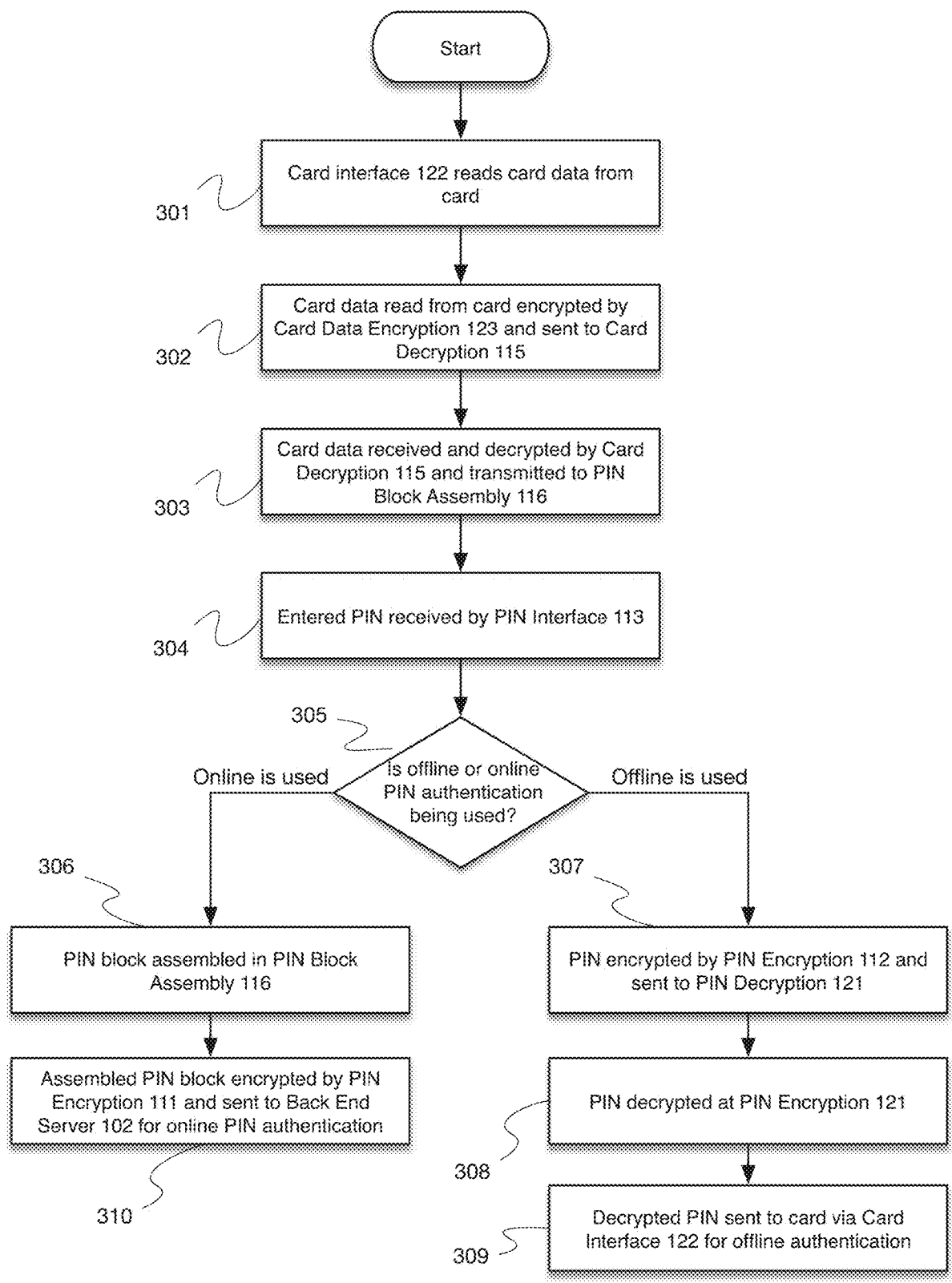
FIG. 3 depicts a flowchart of operation of the architecture of FIG. 2.

FIG. 3 shows a flowchart of operation for the architecture shown in FIG. 2. In step 301, card interface 122 on module 120 reads card data from a user's financial card. In step 302, this card data is encrypted by card data encryption 123 and sent to card decryption 115 on module 110. In step 303, the card data is received and decrypted by card data decryption 115 before being transmitted to PIN block assembly 116. In step 304, the card holder enters a PIN which is received by PIN interface 113. The PIN data can then take one of two possible routes 305 depending on whether offline PIN authentication or online PIN authentication is being used.

In embodiments where online PIN authentication is used, in step 306, PIN block assembly using the PIN and card data is performed in PIN assembly block 116. In step 310, the PIN block is encrypted by PIN encryption 111 and sent to back-end server 102 via network 101. This enables the back-end server 102 to contact the issuing bank to perform PIN authentication. As part of step 310, the card data is sent in real-time to the back-end server 102 for issuer approval of the online transaction. In one embodiment, other transaction data is also sent along with the card data to the back-end server 102 for issuer approval.

In embodiments where offline PIN authentication is used, in step 307, the PIN is encrypted at PIN encryption 112 and transmitted to PIN decryption 121 on module 120. In step 308, the PIN is decrypted at PIN decryption 121. In step 309, the decrypted PIN is then sent to the card via card interface 122 for offline PIN authentication. This increases the flexibility of module 120 significantly, as it can now accept and decrypt encrypted PINs; and facilitate offline data authentication. Therefore, it can work with any device that will send an encrypted PIN. In embodiments where online transactions are employed, the card data is sent in real-time to back-end server 102 for issuer approval. Other transaction data may also be sent along with the card data for issuer approval. When offline transactions are employed, the card and other transaction data is optionally, not sent in real-time to the back-end server 102. Instead, the card data and other transaction data are sent in batch mode to the back-end server 102.

Figure 4:
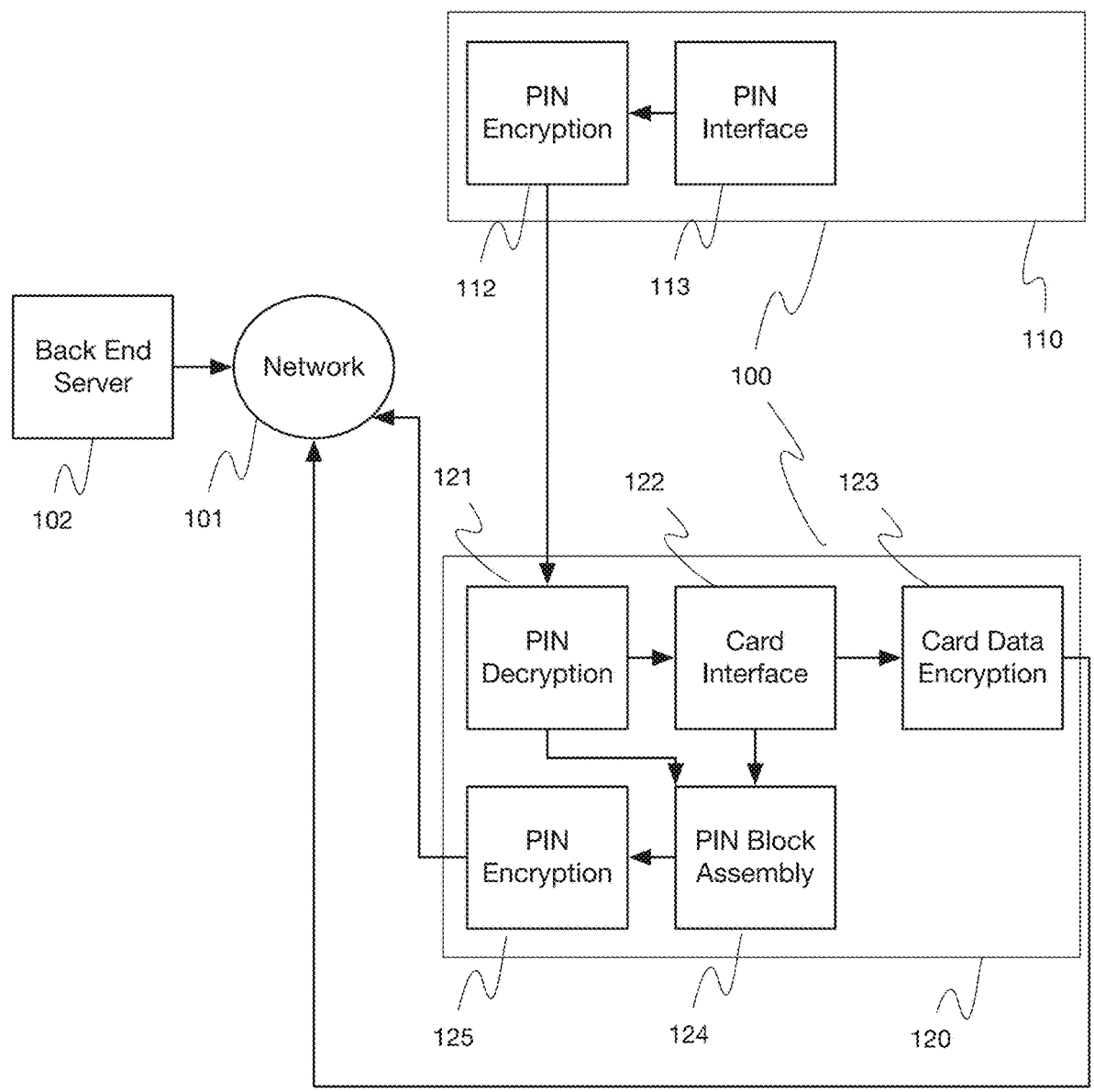
FIG. 4 depicts an example of another exemplary embodiments of the invention.

FIG. 4 is an example embodiment where the card holder authentication module 110 does not contain the PIN Encryption 111, Card Data Encryption 114, Card Data Decryption 115, and PIN Block Assembly 116 modules. The module 110 only receives card holder authentication entries data such as PIN or electronic signatures. This corresponds to a situation where a PIN is entered at a device such as a smartphone or a tablet and module 110 is implemented on the smartphone or tablet and card reading interface module 120 is, for example, on a separate stand-alone device.

Figure 5:
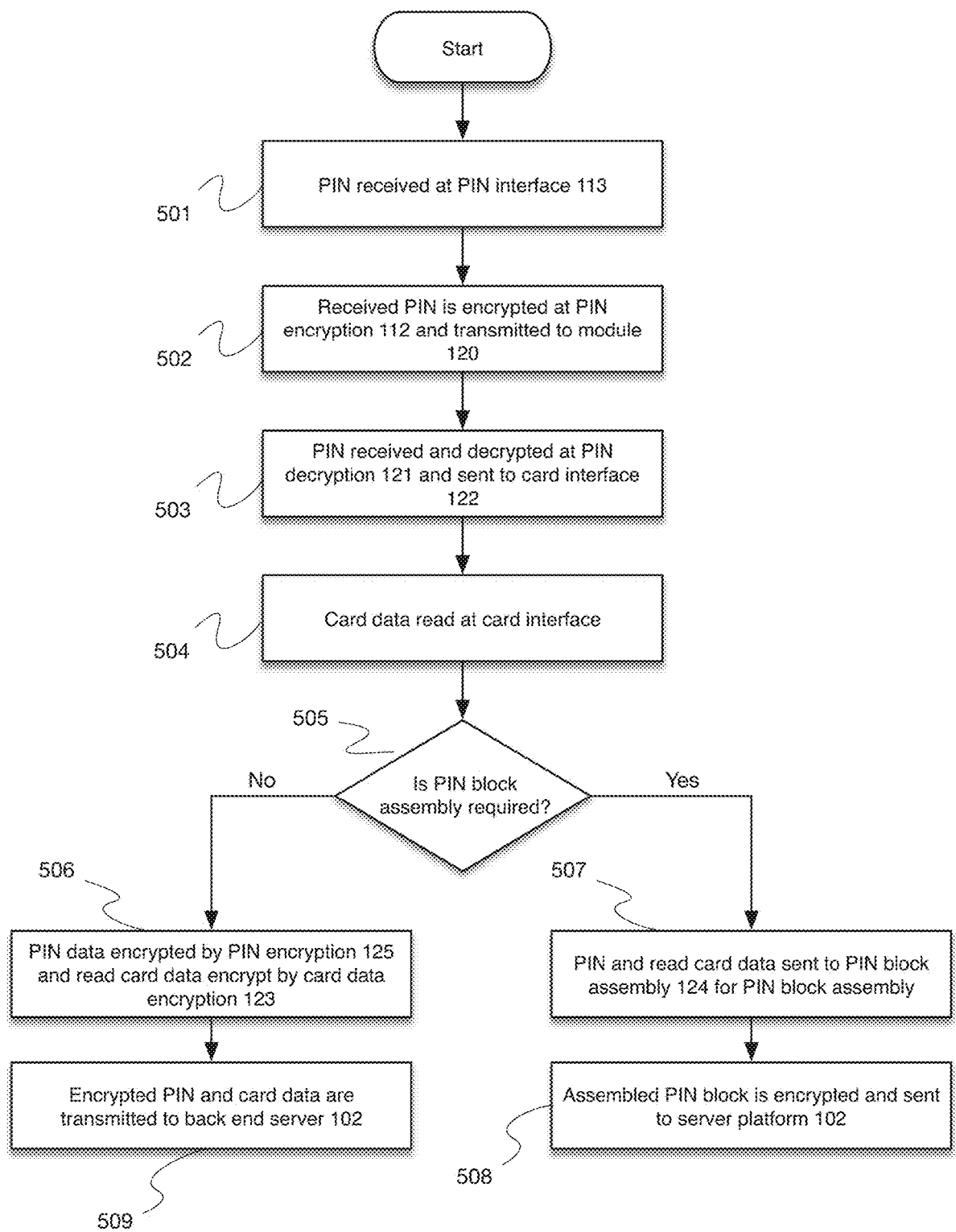
FIG. 5 depicts a flowchart of operation of the architecture of FIG. 4.

A process flow for the operation of the embodiment of FIG. 4 is shown in FIG. 5. In step 501, a PIN is received at PIN interface 113 via, for example, entry by a user. In step 502, the received PIN is encrypted at PIN encryption 112 and transmitted to module 120. Module 120 performs all the necessary steps for the transaction before transmission to back-end server 102 over network 101. In step 503, the PIN received from PIN encryption 112 is decrypted at PIN decryption 121 and sent to card interface 122. In step 504, the card data is read at card interface 122.

In some embodiments, if PIN block assembly is not required (step 505), then in step 506 the PIN data is sent to PIN encryption 125 where the PIN data is encrypted, and the card data read at card interface 122 is sent to card data encryption 123, where it is encrypted. In step 509, the encrypted PIN and card data are transmitted to back-end server 102 via network 101.

In other embodiments, if PIN block assembly is required (step 505) then in step 507 the PIN along with the card data read at card interface 122 is sent to PIN block assembly 124 where the assembly takes place. In step 508, the assembled PIN block is encrypted at PIN encryption 125 and sent to back-end server 102 via network 101.

By separating the EFTPOS terminal into these two modules, certifying the card reading interface module 120 for PIN processing, and certifying the card holder authentication module 110, containing the PIN pad, for account data processing, the impact of changing one module to the compliance of the other modules and the whole system is minimized, and the flexibility of terminal configuration is greatly enhanced.

Figure 6:
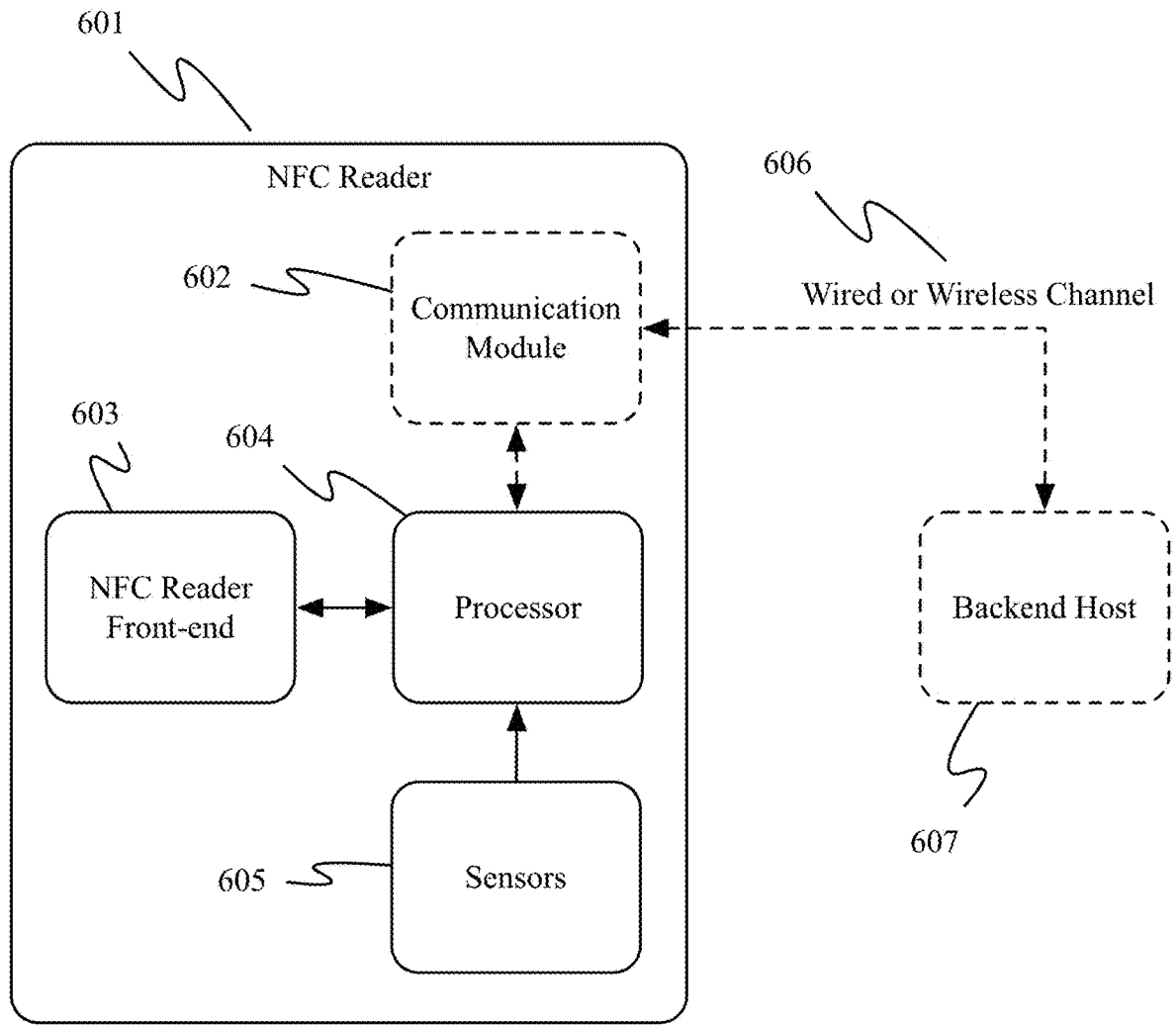
FIG. 6 is a diagram of a card reader with a non-persistent connection to a backend host.

In some embodiments, as explained above, card reading module 120 reads contactless cards. The following describes embodiments of card reading module 120 for contactless card reading which uses hardware and software compatible with the NFC or RFIC standards. is shown in FIG. 6. In the following description below, the terms "card reading module" and "card reader" are used interchangably. The card reader 601 comprises a number of electronic components such as a processor 604, an NFC reader front-end 603, a communication module 602, and a number of sensors 605. The processor 604 includes a CPU, volatile memory, and non-volatile memory as is known in the art. Non-volatile memory stores software or firmware to operate the device and may also store parameters, settings, and data tables to be preserved across power cycles. Examples of non-volatile memory include semiconductor ROM chips, flash memory cards, solid-state disks, and hard disks. Volatile memory is used to store program code for execution and variables used during program execution. The most common example of volatile memory is semiconductor RAM.

The NFC reader front-end 603 contains the analog and digital wireless circuitry to implement the NFC wireless protocol and to connect and communicate with the processor. The NFC reader front-end 603 can also be any other type of wireless, short-range wireless standard including RFID and Bluetooth. In some applications, the NFC reader front-end 603 can be configured by the processor 604.

The communications module 602 interfaces with a back-end host 607 using any number of wired or wireless protocols. Wired protocols include Ethernet, USB, and serial ports. Wireless protocols include 802.11 and cellular phone technologies such as 3G, LTE or 5G. The backend host 607 can be used to monitor and configure the reader 601 and can be a computer, laptop, or other suitable device. The card reader 601 as per an exemplary embodiment of the invention includes a number of sensors 605 that may include a GPS, beacon receivers, altimeters, orientation or incline sensors, a compass, accelerometer and gyroscopes. A beacon signal is any signal that the card reader can identify and help the card reader to know it is near a particular spot. Examples of beacons are a dedicated transmitter that transmits a special data packet, a Wi-Fi router with a particular MAC address, and a cellular base station. Though the beacon is typically placed in a location, the card reader requires a receiver to detect the signal emitted by the beacon. Accelerometers may read 2 or 3 axis of motion and can therefore also function to indicate the orientation and incline of the card reader.

Sensors 605 can be used to detect the location and orientation of the card reader 601 as well as the speed, direction, and acceleration of movement of the card reader 601. The processor 604 interfaces with sensors 605 in order to monitor and collect readings. Sensor readings are analyzed to evaluate the likelihood of unintended, out of bounds, or fraudulent usage of the card reader.

Finally, the reader 601 will include any necessary antennas and front-end system 603 for reading cards by a variety of means including swiping, tapping, or inserting the card in a slot.

Again referring to FIG. 6, the communication module 602, backend host 607, and wired or wireless channel 606 is shown in a dashed line. This is to reflect the fact that these elements of the card reader 601 and card reader system may be on-line or off-line.

Configuration and transaction records may be loaded or unloaded in real time or in batches. Either the card reader 601 or the backend host 607 can determine when the communications elements go on-line or off-line. In on-line systems, analysis and decision making may be done by the backend host 607 or the card reader 601. In off-line systems, the card reader 601 will perform any required analysis, rule evaluation, and decision making.

Figure 7:
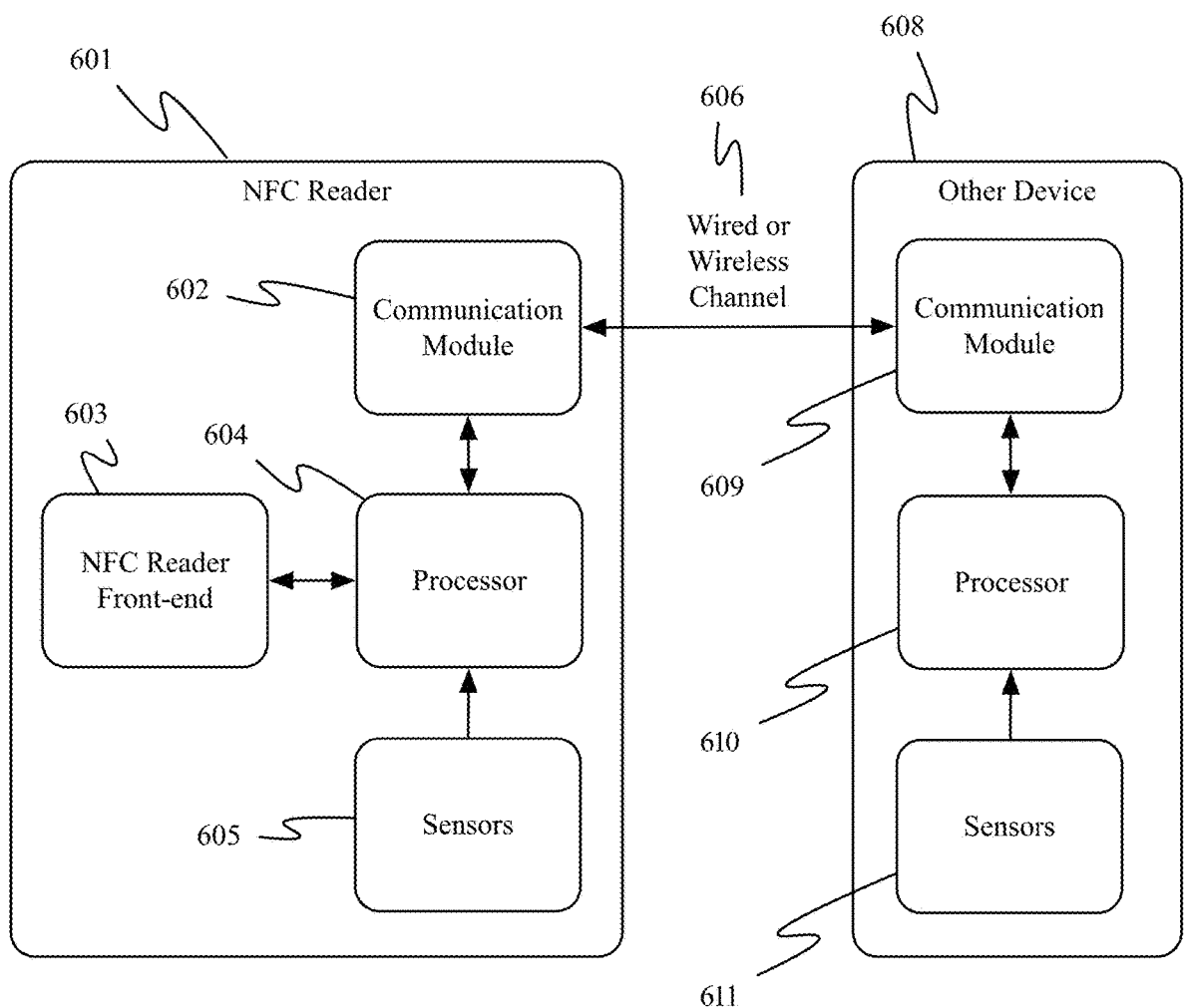
FIG. 7 is a diagram of a card reader tethered to another device.

FIG. 7 shows another embodiment of the invention where the card reader 601 can be connected to another device 608 to make use of capabilities of the other device 608. The other device 608 may be a handheld, mobile device such as a mobile handset. In this configuration the card reader 601 can make use of sensors 611 in the other device 608. The card reader 601 may also make use of the processing power 610 of the other device. If the other device 608 is not secure, the reader 601 will only make use of the other device's sensors 611 in ways that do not compromise analyses used to make security related decisions. For example, a GPS location sensor and an altimeter can be used if wired connection or short-range wireless connection is made, because the two devices' locations are expected to be quite close, however, an accelerometer and gyroscope are unlikely to be used unless it is some way to make sure there is no relative movement between the two devices. Either the backend host 607 of FIG. 6 or the other device 608 of FIG. 7 can be used to augment or replace the processing power of the card reader 601 for analysis of data and results, or decision making.

In use, the card reader 601 is first installed in its location and then authenticated with itself or over a network. Installation can be done through a user interface on the card reader 601, through an attached device 608, or through the backend host 607 accessed over the network 606. During the installation the card reader 601 is configured with information concerning its location, orientation, expected motion characteristics, and other parameters. Location information may include known GPS coordinates, altitude, and data concerning a nearby beacon. Orientation may include the direction the card reader 601 is facing and the inclination of the card reader. Motion may include whether the card reader 601 is expected to move, or if it does move, how fast and far it is expected to move. Similar configuration may also be done with respect to the location of the card reader 601. For example, a fixed store is not expected to move, a train may move at a moderate pace, while an aircraft will accelerate quickly and move much more quickly. A range of acceptable values may also be programed for sensor readings. For example, an installation in a train may not be expected to have a velocity over 150 km/h. A card reader 601 in a store may not be expected to be further than 20m from a beacon. A card reader fixed in place may not be expected to have a difference in inclination more than plus or minus 5 degrees.

Authentication may include verifying the identity of the user, merchant, or location. Authentication may also include logging into a network, attaching a dongle, USB device, or external device, and authenticating with a payment processor. Authentication and re-configuration may be repeated under a variety of conditions, examples of which are given below.

A number of scenarios of the real world usage according to embodiments of the invention are shown in FIG. 8. A card reader 601 is classified by "mobility", that is whether the location it is used in is in motion or is static relative to the earth. For a card reader "static" means the reader location is not in motion relative to earth during card reading, whereas "motion" means the reader location is expected to be in motion relative to earth during card reading. Examples of a card reader location that is static is in a fixed location such as a store. Non-exhaustive examples of a card reader locations that are in motion are if the reader is being used inside a bus, a train, a plane, a cart, or a ship.

Card readers 601 are also be classified by "portability", that is how they move, are repositioned, held, and are used within their place of use. The term "fixed" means the reader is fixed after installation and authentication and does not move within its location. An example would be if it is bolted to a mount, fixed in a holder, or secured to a counter. "mobile" means the reader location can change after installation and authentication. An example of this is a card reader that is being used in mobile arrangement such being placed on desk or in a cradle which relocates frequently. "Handheld" means the reader is expected to be handheld during card reading, either held by merchant or by the card owner.

A key aspect of the embodiments of the invention is for the card reader 601 to decide whether it is being use as intended. If it is detected that the card reader is not being used as intended this may be considered a security breach and measures can be taken to disable the card reader, limit its use, or require reverification. A number of intended usage scenarios are defined and sets of decision rules are applied to determine if the card reader is being used in the intended environment and in a way that is consistent with the expected behavior of the users. Rules are evaluated using input read from a number of sensors that may be located in the card reader, another device tethered or connected to the card reader, in the location, or in the card itself. In some cases, a single rule may suffice. In others, there may be multiple rules that may vary depending on the type of card, the interface between the card and the card reader 601 and the amount of the transaction, currency of the transaction, the bank or organization that issued the card and a number of other parameters. There may be separate rules for a government issued card, a card issued by a financial institution, a loyalty card, and a card issued by a private business.

FIGS. 9A and 9B gives example of an implementation according to one embodiment of the invention that utilizes a number of sensors; a GPS, beacon, altimeter, orientation/ inclination sensor, compass accelerometer, and a gyroscope. Scenarios are defined based on whether the card reader is installed in a location in motion or static and if the reader itself is fixed in place, mobile, or handheld. FIGS. 9A and 9B list the expected data the card reader 601 would read from sensors 605 in the card reader, attached device 611, or other sensors. For each scenario rules are defined based on the location, orientation, and other parameters as sensed by the card reader 601. Location refers to the location of the card reader and can be measured by a GPS, beacons, altimeters, and other sensors. Orientation refers to the directional heading (north, south, east, west) and inclination, whether the reader is level. Orientation can be measured using sensors such as a compass, orientation/incline sensor, and others. Motion refers to the displacement, velocity and acceleration of the card reader over time. Motion can be measured using sensors such as an accelerometer, a gyroscope, and others. Note that for other scenarios and for other sensors, the rules may be modified or additional rules may be added or deleted.

A variance in any of the expected readings triggers an event that may force the card reader to re-authenticate, to shutdown, or to send an alert to a user, administrator, or other party monitoring the system. Variances may be indicated on the card reader, an attached device, or through a monitoring device or party over the network.

One scenario 901 is when the card reader is fixed in a static location. In this case the GPS and altimeter would be expected to correspond to the known location and the signal from a beacon installed in the same location would be received. The orientation and incline would be very close to the readings in which the card reader was installed. The accelerometer and gyroscope would indicate no movement.

Another scenario 902 is when the card reader is fixed in a location that is in motion. An example of this may be a card reader fixed at a check-out counter in a store on a train. The GPS and altimeter reading should be within the expected range and a beacon placed within the location will be readable. The orientation sensor/incline sensor will return a range of values that are consistent and cross-referenced with the present location of the installation as measured by the location readings and the motion readings. The compass readings will be consistent with the gyroscope readings. As the installation is expected to move, motion readings outside an expected range will be deemed to be unusual and may trigger a re-authorization procedure. Accelerometer readings should agree with the GPS data and orientation data. The gyroscope should return data consistent with the compass readings.

A further scenario 903 is where the card reader is mobile and the installation is static. This may occur when there is a mobile cart within a large building. The cart moves within the location but is not expected to exit the building. The location sensors, the GPS and altimeter will be within the range consistent with the bounds of the location. The location information will remain stable for a predefined time before a card is read since the cart will have to stop moving in order to process a transaction. Beacon information will be readable. Similarly, the orientation information will be within bounds and be stable for a short time before the card is read. Accelerometer and gyroscope information will be static within tight bounds. If no movement occurs for a predefined period of time (the cart has not moved in a long time), re-authorization may be required.

The next scenario 904 is a mobile reader installed on a platform in motion. This could be the case of a card reader fixed to a food and drink cart used on an aircraft. The GPS and altimeter sensor data will be consistent with an aircraft flight or more specifically, with the flight plan of a particular aircraft. GPS information will indicate that the cart and reader are still on the aircraft. Location will be used to supplement the orientation information. The orientation/incline sensor will be within a limited range qualified by the rate of change of the motion and location information. The compass data will agree with the gyroscope data. Motion data is used to supplement the orientation information for decision making. The accelerometer readings will agree with the GPS data and orientation data. The gyroscope will agree with the compass.

Next the scenario 905 of a handheld card reader in a static location is considered. This would correspond with a handheld payment card reader in a restaurant. The GPS and altimeter would be a match for the bounds of the location. A signal from a beacon would be received. A location change that exceeded the location bounds would trigger a re-authorization as it could indicate that the card reader had left the building. Due to the large number of movements experienced by a handheld device orientation information would not be used. Acceptable ranged of acceleration and velocity would be permitted as expected for a handheld device where the holder would be expected to be walking.

The final scenario 906 depicted in FIG. 9B is the case of a handheld card reader when the installed location is in motion. The location will be verified against the route of the location, such as in a delivery truck, where the route may also change based on season or weather. The GPS and altimeter data will be consistent with the route and a signal from a beacon in the truck will be received. Often orientation and motion information will not be used in this scenario.

FIG. 10 shows an alternative preferred embodiment of a card reader 601 with fewer sensors 605, 611 compared to the previous embodiment of FIGS. 9A and 9B. The embodiment of FIG. 10 cover the same scenarios as in FIGS. 9A and 9B but the sensors 605, 611 are limited to a beacon, orientation/inclination sensor, and an accelerometer. Sensors and readings are still divided into three groups; location, orientation, and motion. A beacon is installed at the location and is used to verify that the card reader is within range of the location. If the card reader moves too far from the beacon it will lose contact with the card reader 601. The orientation of the card reader is detected using only an orientation/incline sensor. An accelerometer is used to determine motion.

Processing may be done by the card reader 601, other tethered device 608, the backend host 607, or any combination of the above.

The above listed preferred implementation by no means to be exhaustive, and many possible ways of implementation using different combinations of sensors are possible.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

It will be appreciated by those skilled in the art having the benefit of this disclosure that this SYSTEM AND METHOD TO PREVENT UNAUTHORIZED USAGE OF CARD READERS AND MODULAR ELECTRONIC FUNDS TRANSFER POINT OF SALE DEVICE provides systems and methods for card readers within a point of sale terminal to facilitate easy replaceability and determine when a contactless card reader is used in a fraudulent manner. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A terminal device comprising:
   a processor;
   a card holder authenticator coupled with the processor;
   a card reader, coupled with the processor and the card holder authenticator; and
   the processor receiving a set of parameters related to a location, orientation and motion associated with the card reader from a set of sensors coupled to the processor, and utilizing the set of parameters and first scenario configuration data to evaluate a first rule,
   wherein the evaluation of the first rule results in a limitation on an operation of the card reader, said first scenario configuration data is based on a classification of a first mobility of the card reader, and the classification of the first mobility of the card reader comprises selection of a usage location of the card reader either being static or in motion.

2. The card reader of claim 1, wherein an external device is coupled to the card reader.

3. The card reader of claim 2, wherein the set of sensors is located within the external device.

4. The card reader of claim 2, wherein the evaluation of the first rule is performed on the external device.

5. The card reader of claim 1, wherein the processor utilizes the set of parameters and second scenario configuration data to evaluate a second rule.

6. The card reader of claim 1, further comprising a communications module coupled to the processor.

7. The card reader of claim 6, wherein the communications module receives the first scenario configuration data from external sources.

8. The card reader of claim 6, wherein the evaluation of the first rule is performed by a backend host coupled to the communications module.

9. The card reader of claim 1, wherein the processor utilizes the set of parameters and second scenario configuration data to evaluate a second rule; and
   said second scenario configuration data is based on a classification of a second mobility of the card reader.

10. The card reader of claim 1, wherein the first rule is based on either an amount of a transaction or a currency of the transaction.

11. The terminal device of claim 1, further comprising:
    the card reader configured to read card information from a card; and
    the card holder authenticator configured to authenticate one or more of the card and an account associated with the card.

12. The terminal device of claim 1, wherein the card reader is certified against a card reading security standard, and wherein the card holder authenticator is certified against at least one of a card holder authentication security standard and an account data security standard.

13. A method for reading a card in a usage location, the method comprising:
    receiving, by a processor of a terminal device, a set of parameters related to a location, orientation and motion associated with a card reader from a set of sensors coupled to the processor, the card reader and a card holder authenticator are comprised in the terminal device;
    utilizing, by the processor of the terminal device, the set of parameters and scenario configuration data to evaluate one or more rules, and said scenario configuration data is based on a classification of a mobility of the card reader, wherein the classification of the mobility of the card reader comprises selection of the usage location of the card reader either being static or in motion; and
    limiting, by the processor of the terminal, an operation of the card reader based on the evaluation of the one or more rules.

14. The method of claim 13, further wherein said scenario configuration data is based on a classification of a portability of the card reader.

15. The method of claim 14, further wherein the classification of the portability of the card reader comprises selecting one of fixed, mobile or handheld.

16. The method of claim 13, wherein at least one of the one or more rules is based on one or more of:
    at least one of a range of accelerations and a range of velocities,
    at least one of matching a plan or a route,
    at least one of a displacement and an orientation of the card reader, and
    at least one of an amount of a transaction or a currency of the transaction.

17. The method of claim 13, wherein the set of parameters comprise at least one of Global Positioning Satellite (GPS), altimeter, accelerometer, and gyroscope readings.

18. The method of claim 13, wherein the card is issued by a bank or an organization, and at least one of the one or more rules is based on the bank or the organization.

19. The method of claim 13, wherein the card reader reads card information from a card, and the card holder authenticator authenticates one or more of the card and an account associated with the card.

20. The method of claim 13, wherein the card reader is certified against a card reading security standard, and wherein the card holder authenticator is certified against at least one of a card holder authentication security standard and an account data security standard.

* * * * *